UNITED STATES PATENT OFFICE.

HARRY WILLIAMS CHARLTON, OF NEW YORK, N. Y., ASSIGNOR TO AMERICAN POTASH CORPORATION, A VIRGINIA COMPANY.

REDUCING SLUDGE TO POWDER.

1,397,078.  Specification of Letters Patent.  Patented Nov. 15, 1921.

No Drawing.   Application filed April 26, 1920.   Serial No. 376,574.

*To all whom it may concern:*

Be it known that I, HARRY WILLIAMS CHARLTON, a citizen of Canada, residing at New York, in the county of New York and State of New York, have invented a new and useful Improvement in Reducing Sludge to Powder, of which the following is a specification.

My invention relates to a method of improving the physical condition of wet plastic and putty-like substances resulting from the digestion of various materials particularly silicates and greensand with lime. The material resulting from the digestion, preferably under superatmospheric pressure, on account of its caking and balling up properties, is scarcely amenable to a drying treatment, according to the ordinary method and in the usual style of driers. This digestion residue, its method of manufacture and various uses, is more fully described in my U. S. Patents No. 1,327,145, Jan. 20th, 1920; No. 1,242,421, Oct. 9th, 1917, and No. 1,249,028, Dec. 4th, 1917.

When it is to be employed as a binding material in brick manufacture, it is advantageous to transform this wet plastic material into a powder before mixing with the sand, molding and steaming.

I have now discovered that a dehydrating agent which expands and gives out heat on hydrating will, when mixed with the wet digestion residue in suitable proportion, give a fine dry powder in a very short time or a crumbly plastic mass if partially dried.

As an example of my invention, a plastic hydrous silicate carrying from twenty-five to forty-five per cent. water is mixed with from twenty to fifty per cent. of its weight of unslaked lime ($CaO$) and the mass allowed to heat preferably in a pit. In the course of a few hours a dry almost impalpable powder results providing sufficient drying agent is added. If a fully dried mass is not desired the amount of unslaked lime is reduced to meet the requirements.

Although I have referred particularly to a green-lime digestion residue I do not wish to be limited to this as the process applies equally well to digestion residues from feldspar, leucite, etc. Nor do I wish to be limited to the employment of pure lime.

As the above mentioned digestion product is capable of many applications, such as a binder in brick, stucco, plaster, brick mortar, and agricultural lime, etc., I find that in a dried condition of the nature above described, it is even more valuable as it may be more easily shipped.

In reference to the employment of the digestion residue partially dehydrated as a fertilizer, another important advantage is to be considered. It must be partially dried to permit of an easy and uniform distribution on the land as well as to make possible its transportation under the usual conditions.

It is obvious that those skilled in the art may vary the details of the process without departing from the spirit of the invention, and therefore I do not wish to be limited to the above disclosures except as may be required by the claim.

I claim:—

A process of disintegrating the putty-like mass resulting from the digestion of greensand and lime which comprises mixing unslaked lime with the same and thereby forming a crumbly material; substantially as described.

HARRY WILLIAMS CHARLTON.